United States Patent
Bohannon, Jr. et al.

(10) Patent No.: US 8,292,490 B2
(45) Date of Patent: Oct. 23, 2012

(54) BLENDER CONTROL APPARATUS AND METHOD

(75) Inventors: John Robert Bohannon, Jr., Richmond, VA (US); Brian Paul Williams, Midlothian, VA (US)

(73) Assignee: Hamilton Beach Brands, Inc., Glen Allen, VA (US)

( * ) Notice: Subject to any disclaimer, the term of this patent is extended or adjusted under 35 U.S.C. 154(b) by 1349 days.

(21) Appl. No.: 11/074,896

(22) Filed: Mar. 8, 2005

(65) Prior Publication Data

US 2006/0203610 A1    Sep. 14, 2006

(51) Int. Cl.
*A47J 43/046* (2006.01)

(52) U.S. Cl. ........ 366/206; 366/601; 241/36; 241/282.1

(58) Field of Classification Search .................. 366/205, 366/601, 206; 241/36, 199.12, 282.1, 282.2
See application file for complete search history.

(56) References Cited

U.S. PATENT DOCUMENTS

| | | |
|---|---|---|
| 4,002,891 A | 1/1977 | Porter |
| 4,276,750 A | 7/1981 | Kawasumi |
| 4,295,420 A | 10/1981 | Satake et al. |
| 4,527,904 A | 7/1985 | Weetman |
| 4,568,193 A | 2/1986 | Contri et al. |
| 4,568,196 A | 2/1986 | Hacheney |
| 4,668,096 A | 5/1987 | Saaty |
| 4,681,030 A | 7/1987 | Herbert |
| 4,747,690 A | 5/1988 | Hayashi |
| 4,790,665 A | 12/1988 | Hayashi |
| 5,156,867 A | 10/1992 | Leuthold et al. |
| 5,156,868 A | 10/1992 | Muntener et al. |
| 5,200,220 A | 4/1993 | Capodieci |
| 5,332,588 A | 7/1994 | Capodieci |
| 5,347,205 A | 9/1994 | Piland |
| 5,380,086 A | 1/1995 | Dickson |
| 5,472,273 A | 12/1995 | Fowler et al. |
| 5,481,968 A | 1/1996 | Clem |
| 5,513,912 A | 5/1996 | Lotz et al. |
| 5,556,198 A | 9/1996 | Dickson, Jr. et al. |
| 5,619,901 A | 4/1997 | Reese et al. |
| 5,960,701 A | 10/1999 | Reese et al. |
| 5,967,021 A | 10/1999 | Yung |

(Continued)

FOREIGN PATENT DOCUMENTS

EP    1 269 899    1/2003

OTHER PUBLICATIONS

PCT Search Report and Written Opinion; Application No. PCT/US2006/008236; Mailing date Sep. 20, 2007.

(Continued)

*Primary Examiner* — David Sorkin

(74) *Attorney, Agent, or Firm* — Alexander D. Raring

(57) ABSTRACT

A blender control apparatus and method includes monitoring the operation of a blender motor as a measure of monitoring the quality and results of blending. By connecting a feedback sensor to the motor, it is possible to determine whether a blend process is complete. It is also possible to identify when cavitation is occurring or about to occur. In another aspect, the blender controls are directed to an improved method for portion blending. The method includes a two-step query to the user to determine both a predetermined blender cycle and the number of portions to be blended.

12 Claims, 7 Drawing Sheets

U.S. PATENT DOCUMENTS

| | | | |
|---|---|---|---|
| 6,029,568 A | 2/2000 | Pascotti et al. | |
| 6,194,013 B1 | 2/2001 | Kolar et al. | |
| 6,342,260 B2 | 1/2002 | Kolar et al. | |
| 6,364,522 B2 | 4/2002 | Kolar et al. | |
| 6,402,365 B1 | 6/2002 | Wong | |
| 6,446,547 B2 | 9/2002 | Kubicko et al. | |
| 6,609,821 B2 | 8/2003 | Wulf et al. | |
| 6,632,013 B2 | 10/2003 | Wulf et al. | |
| 6,656,515 B2 | 12/2003 | Lowry et al. | |
| 6,679,820 B2 * | 1/2004 | Barkus et al. | 494/8 |
| 6,759,072 B1 | 7/2004 | Gutwein et al. | |
| 7,290,724 B2 | 11/2007 | Lin et al. | |
| 2001/0028913 A1 | 10/2001 | Kolar et al. | |
| 2002/0009017 A1 | 1/2002 | Kolar et al. | |
| 2002/0048626 A1 | 4/2002 | Miller et al. | |
| 2002/0126570 A1 | 9/2002 | Kamoshida et al. | |
| 2002/0141286 A1 | 10/2002 | Wulf et al. | |
| 2002/0176320 A1 | 11/2002 | Wulf et al. | |
| 2003/0142581 A1 | 7/2003 | Barton et al. | |
| 2003/0213373 A1 | 11/2003 | Dickson, Jr. | |

OTHER PUBLICATIONS

Japanese patent application, Serial No. JP06-205729A; Publication Date Jul. 26, 1994 5 pages.

\* cited by examiner

BLENDER CONTROL APPARATUS AND METHOD

The present invention is directed to an electronic control system for use with blenders. In one example, the system includes a feedback sensor connected to a blender motor. In another example, the system includes a simple user input method for achieving effective portion blending.

BACKGROUND

Contemporary blenders are being called upon for more and more demanding applications. Both home and commercial blender use may include a broad range of material to be processed and blended. The material being blended includes dairy products (e.g., milkshakes) to smoothies (with, e.g., frozen fruit) to frozen cocktails (e.g., daiquiris and margaritas). The different materials to be blended have different blend characteristics. For instance, some of the materials are easy to blend and blend quickly, while other materials are very hard and are very difficult to process and blend.

Many blenders are programmed or programmable for different uses. The blender program will include different cycles that vary the blend speed and time of blend in order to obtain a targeted result. A problem that may be encountered is over-blending or underblending of a material. Overblending or underblending may be caused by user error or just by variations in batches of material being processed and blended. The result is the same—watery or still chunky end product. At the very least, the broad range of material to be blended makes difficult a consistent textured drink.

Another common problem is cavitation. Many times when aggressive media is added to a drink, a gas pocket will form in the mix which is called cavitation. This is typically remedied by allowing the blender to continue blending until the pocket ruptures (as a result of vibration and/or melting) or the container may be shaken to loosen the mix.

A still further issue concerns the programmability of blender cycles, particularly in a commercial setting. There is a lot of interest in blenders having programmability so that a user may touch a single button to actuate the blender. The blender then automatically runs a predetermined cycle. However, this single button programmability requires knowledge of the buttons—that is, which is the right button for the right drink. The determination of the right drink also includes variation with respect to the number of portions being blended. Portion blending is not solved by merely lengthening a blend cycle by a multiple of the number of portions desired.

SUMMARY

Accordingly, it is an object of the present invention to overcome the foregoing drawbacks with existing blender control systems. A feedback sensor may be operatively connected to a blender motor, jar pad or any component between, near or part of the motor and blender container to detect an attribute associated with the operation of the motor. By monitoring that operation and controlling the motor based on that feedback, a consistent blended product may be obtained and cavitation may be minimized. Additionally, effective portion blending may be obtained through a two-step user query that allows for the user to input the type of drink and then the number portions in order to actuate a blend cycle that is predetermined for that specific purpose.

In one example, an electronic blender control system for producing a consistent, blended material comprises a blender assembly comprising a blender motor operatively connected to a cutter assembly, wherein the cutter assembly is mounted in a blender jar for blending material placed within the jar. An energy control switch activates and controls the amount of energy delivered to the motor during operation of the motor. A feedback sensor is electrically connected to the energy control switch, wherein the feedback sensor is adapted to detect an attribute associated with the operation of the motor and send a signal to the energy control switch based on the attribute detected. The attribute detected may include revolutions per minute of the blender motor, the amount of power used by the motor, or the amount of torque exerted, or the vibration on the motor during operation. A signal may be sent to the energy control switch when the attribute detected reaches or exceeds a predetermined amount. The signal that is sent may be a command to reduce the amount of energy delivered to the motor, which may be, for example, a command that substantially zero energy be delivered to the motor.

In another example, an electronic blender anticavitation control system comprises a blender assembly comprising a blender motor operatively connected to a cutter assembly, wherein the cutter assembly is mounted in a blender jar for blending material placed within the jar. An energy control switch activates and controls the amount of energy delivered to the motor during operation of the motor. A feedback processor comprises a feedback sensor electrically connected to the energy switch, wherein the feedback sensor is adapted to detect an attribute associated with the operation of the motor and send a signal to the energy control switch based on the attribute detected. The feedback processor is adapted to analyze the attribute information detected by the feedback sensor, and when the processor determines that cavitation is occurring, it sends a signal to the energy control switch to change the amount of energy delivered to the motor. The signal sent to the energy control switch may be a command to reduce or substantially shut off the energy delivered.

In another example, a method of controlling blender operation to produce a consistent, blended material comprises the steps of providing (a) blender assembly comprising a blender motor operatively connected to a cutter assembly, wherein the cutter assembly is mounted in a blender jar for blending material placed with the jar; (b) an energy control switch that activates and controls the amount of energy delivered to the motor during operation of the motor; and (c) a feedback sensor electrically connected to the energy control switch, wherein the feedback sensor is adapted to detect an attribute associated with the operation of the motor and send a signal to the energy control switch based on the attribute detected. The method further comprises the step of adding material to the blender jar and activating the blender motor. The signal from the feedback sensor to the energy switch is recorded at predetermined time intervals and the signals are compared over time. The blender motor is deactivated when a predetermined relationship is found in the signals recorded from the feedback sensor.

In a still further example, a method of reducing cavitation in a blender comprises the steps of providing (a) blender assembly comprising a blender motor operatively connected to a cutter assembly, wherein the cutter assembly is mounted in a blender for blending material placed with the jar; (b) an energy control switch that activates and controls the amount of energy delivered to the motor during operation of the motor; and (c) a feedback processor comprising a feedback sensor electrically connected to the energy control switch, wherein the feedback sensor is adapted to detect an attribute with the operation of the motor and send a signal to the energy control switch based on the attribute detected. The method further includes adding material into the blender jar and activating the blender jar. The method includes recording the signal from the feedback sensor at predetermined time intervals and analyzing the signal over time in determining when cavitation is occurring. When cavitation is occurring, the method includes sending a signal to the energy control switch to reduce the power to the blender motor for a predetermined time period, and then increasing the energy to the blender motor at the end of the predetermined time period. Alternatively, when cavitation is occurring, the method includes sending a signal that actuates another method, such as inducing vibration, that reduces or eliminates cavitation.

In a still further example, a method of blending a material comprises providing a blender assembly comprising a blender jar and a blender motor operatively connected to a cutter assembly mounted in the blender jar. The method includes providing a graphic user interface operatively connected to the blender motor and displaying on the graphic user interface a plurality of first selection choices corresponding to predefined blender cycles. The method includes selecting a predefined blender cycle. Still further, the method includes displaying on the graphic user interface a plurality of second selection choices corresponding to a number of portions of material to be blended, and then selecting the number of portions of material to be blended. The predefined blender cycles may correspond to different types of drinks. The portions of material may correspond to the number of drinks to be served from the blended material.

DETAILED DESCRIPTION

Figure 1:
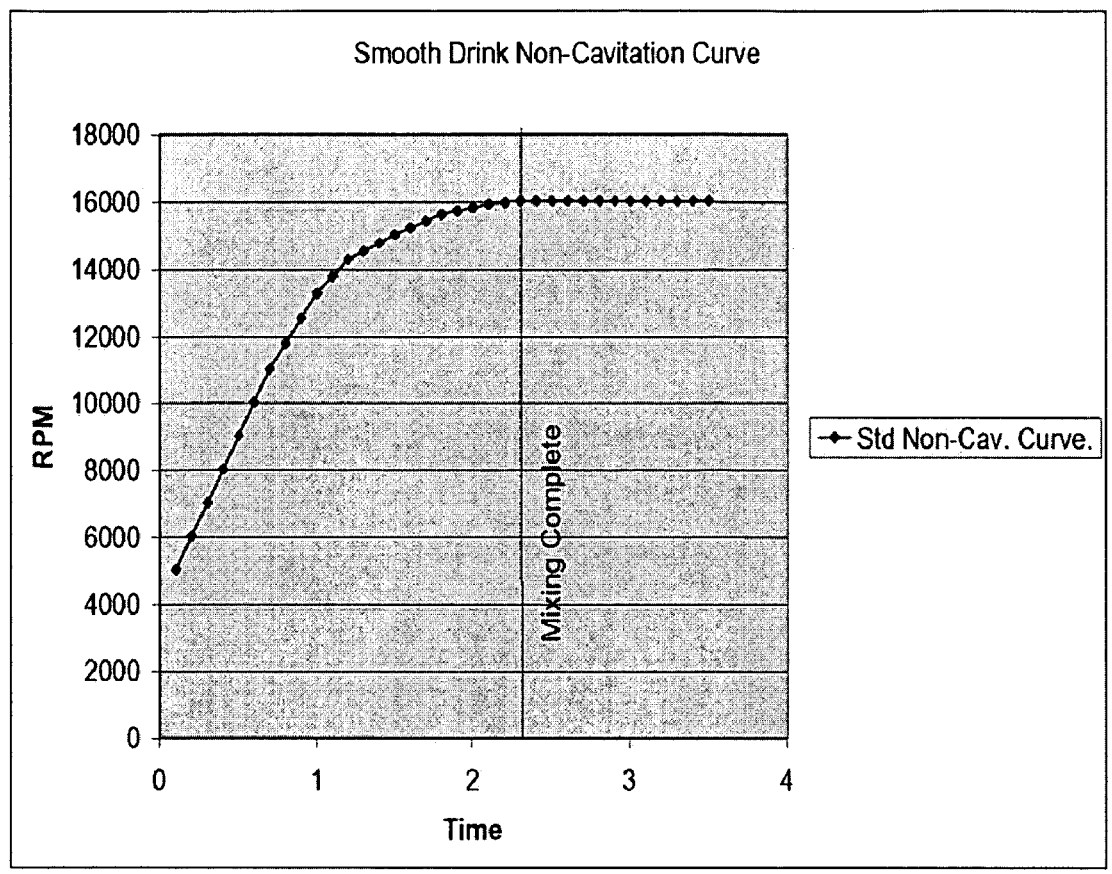
FIG. 1 is a graph showing an idealized smooth drink non-cavitation curve with respect to the operation of a blender when comparing RPM versus time.
Figure 2:
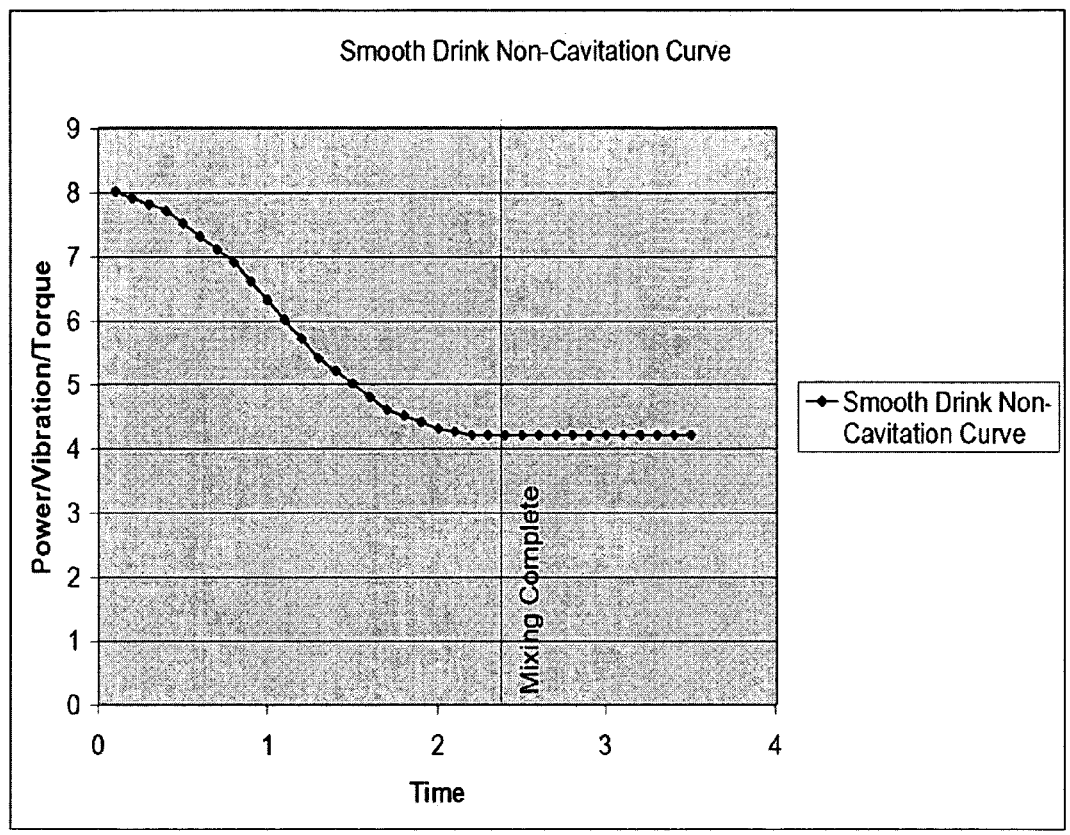
FIG. 2 is an idealized smooth drink non-cavitation curve with respect to the operation of a blender when comparing power/vibration/torque versus time.
Figure 3:
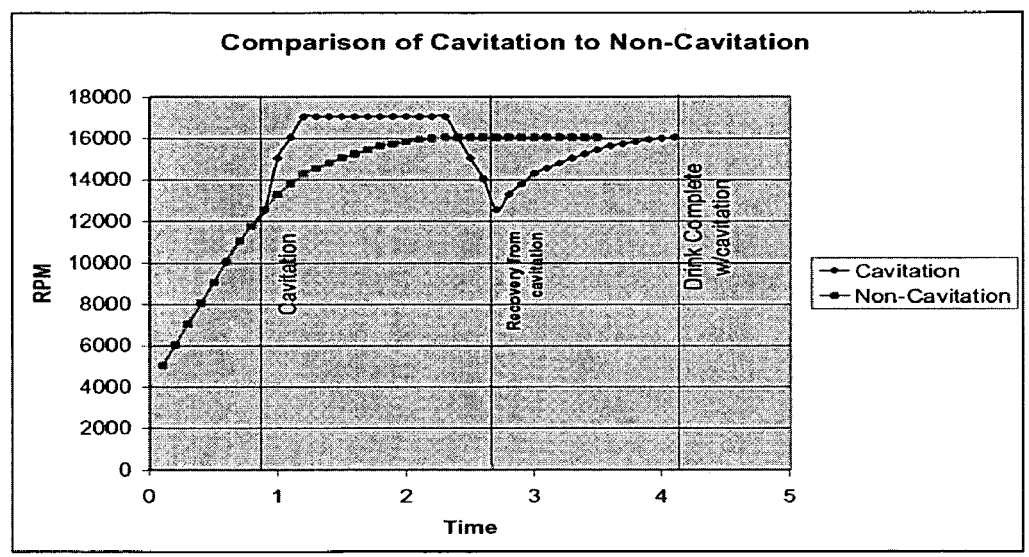
FIG. 3 is a curve showing a comparison of the cavitation curve versus a non-cavitation curve.
Figure 4:
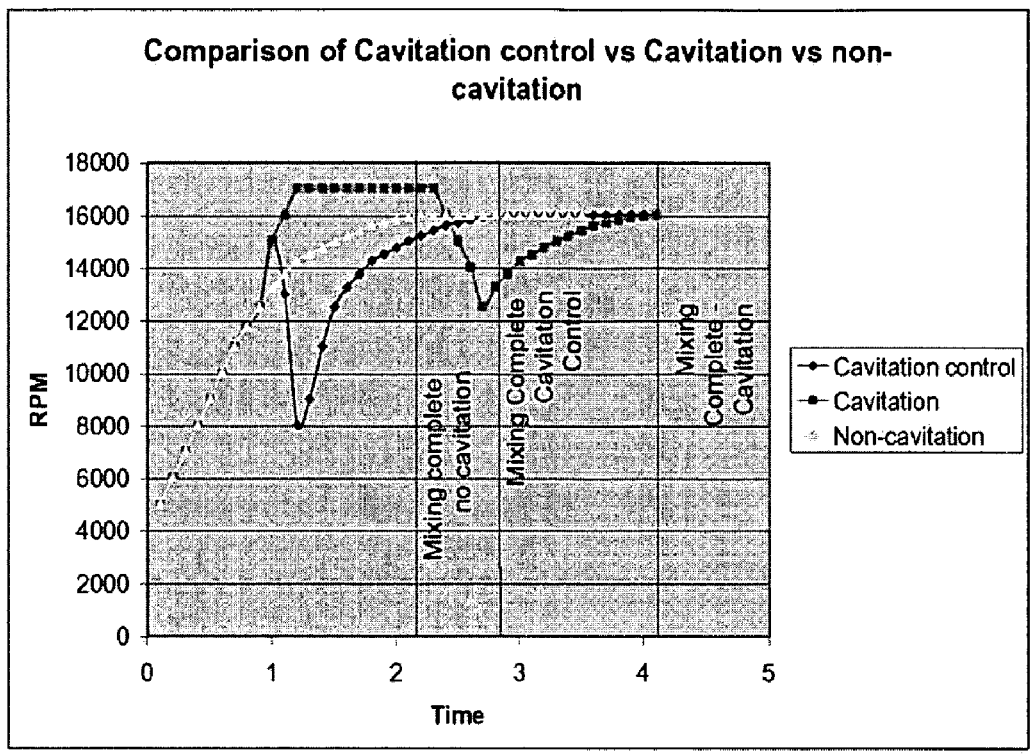
FIG. 4 shows a comparison of a cavitation control system versus cavitation versus a non-cavitation curve as compared in RPM verses time.

The present invention is directed to blender controls. The blender control apparatuses and methods include monitoring the operation of a blender motor as a measure of monitoring the quality and results of blending. By connecting a feedback sensor to the motor, jar pad or any component between, near or part of the motor and blender container, it is possible to determine whether a blend process is complete. It is also possible to identify when cavitation is occurring or about to occur. The feedback sensor may then be used to shut down or modify the operation of the blender. In this way, there is no over blending or under blending of the material. There is also a reduction and minimization of cavitation during blending.

Another aspect of the controls herein is an improved method for portion blending. The portion blending method includes a two-step query to a user to determine both a predetermined blender cycle and the number of portions to be blended. Either the blender cycle or the number of portions may be selected first. In either event, the result is a two-step path to identify and set in motion a predefined blender cycle appropriate to the amount of material and type of material being blended. While all of the cycles are predefined, the method allows for an intuitive and simple way to initiate the operation of the blender.

The present invention is applicable to conventional blender assembly constructions. The blender assembly has a blender motor operatively connected to a cutter assembly. The cutter assembly is mounted in a blender jar for blending material placed within the jar. The blender motor is activated and controlled by an energy control switch. The switch controls the amount of energy delivered to the motor during operation of the motor. The switch is typically a multiple speed or continuously variable speed switch so that different speeds of the cutter assembly are available for different blending jobs.

A feedback sensor is electrically connected to the energy control switch. The feedback sensor is connected to the motor mounted proximate the motor or mounted anywhere in the blender assembly including the motor mount, jar and jar pad. The sensor is adapted to detect an attribute associated with the operation of the motor and send a signal the energy control switch based on the attribute detected. The operation of the sensor is described further with reference to FIGS. 1-4. The use of the sensor is described in terms of an automatic blend concept and an anticavitation control concept. All of these examples are based on the monitoring of the operation of the blender motor. The feedback from the motor is used to obtain a consistent, textured blended product.

When a drink is blended in a blender, there is a common cycle that the blender follows as the drink is blended. A blender will start out at a lower RPM and slowly climb in speed until it reaches a maximum RPM as dictated by the viscosity of the mixture. This ramp will climb faster or slower depending on the media in the blender and how long it takes to break it down into a homogeneous mixture. There is also a fluctuation in speed as the unit impacts the media. This fluctuation will lower as the media is broken down.

An alternate way of looking at this is through the power, vibration or torque of the motor. At the beginning of the blend cycle each of these items are much higher as the media has not been broken down. They slowly decrease and finally stabilize as the mixture becomes more homogeneous.

Many times in the busy environment in which blenders are used, drinks are overblended as the operator becomes involved with other work as the mixture is blending. The result of this is a watery drink due to the extended blending time. The other extreme is when the operator is in a hurry and stops blending before the desired consistency is obtained.

Noted earlier herein, and as shown in FIGS. 1 and 2, the idealized curves of RPM, power, vibration, torque and other measurable items follow a similar or predictable path. Knowing these traits, it can theoretically be determined when blending of the mix is complete and the cycle can be stopped. This is also applicable to the texture (particle size) as it can be determined when to stop the unit for the preferred texture. Through monitoring any one, all or a number of these traits, it is possible to adjust the mixer to stop when a desired texture has been obtained.

Many times, and especially when aggressive media is added to a drink, a gas pocket will form in the mix which is called cavitation. This is typically remedied by allowing the blender to continue blending until the pocket ruptures (due to vibration and melting) or the container is shaken to loosen the mix.

When cavitation occurs, the media in the material quickly loses contact with the blades until the gas pocket is formed.

When this occurs: the RPM's quickly rise on the motor and the power/torque/vibration associated with the motor quickly drops along with other measurable items. Knowing these traits allows an easy way to monitor when cavitation occurs. When cavitation starts to form in the media, the blender speed is adjusted to minimize or eliminate it. After which the speed is allowed to return to normal to complete the normal cycle. This, would allow for the blend time to be minimized and no operator intervention to be needed.

One method of measuring these traits is by the use of monitoring RPM's by a Hall effect sensor and a (single/multi) poled magnet. Initially, when the media has not been broken down, the speed of the motor will be erratic, varying up and down as the blades impact the media in the jar. As the media is broken down, this speed will become more and more consistent. This "variation" of speed could be used to determine how far the media has been broken down. By monitoring the variation of speed, the sensor can stop the blending at the desired texture. This technique could also be used to determine the progress of blending and make adjustments to a predefined cycle. For instance, if more media was added mid-cycle, the energy control switch would detect more variation and continue blending until the variation lowers to the desired or target levels. A Hall effect sensor is only one of many ways to detect these blending characteristics.

Just as using the feedback sensor simplifies the blending process for a user, an improved user interface facilitates accurate portion blending. The blender assembly that is able to use this improved interface is generally a blender assembly having a blender jar and a blender motor operatively connected to a cutter assembly that is mounted in the blender jar. A graphic user interface is operatively connected to the blender motor. The graphic user interface includes a plurality of first selection choices that correspond to predefined blender cycles. The graphic user interface also includes a plurality of second selection choices that correspond to a number of portions of material that may be blended. The user merely selects a predefined blender cycle and a number of portions to be blended, and then the blender control activates a predetermined cycle that is for the purpose of blending that specific material.

Figure 5:
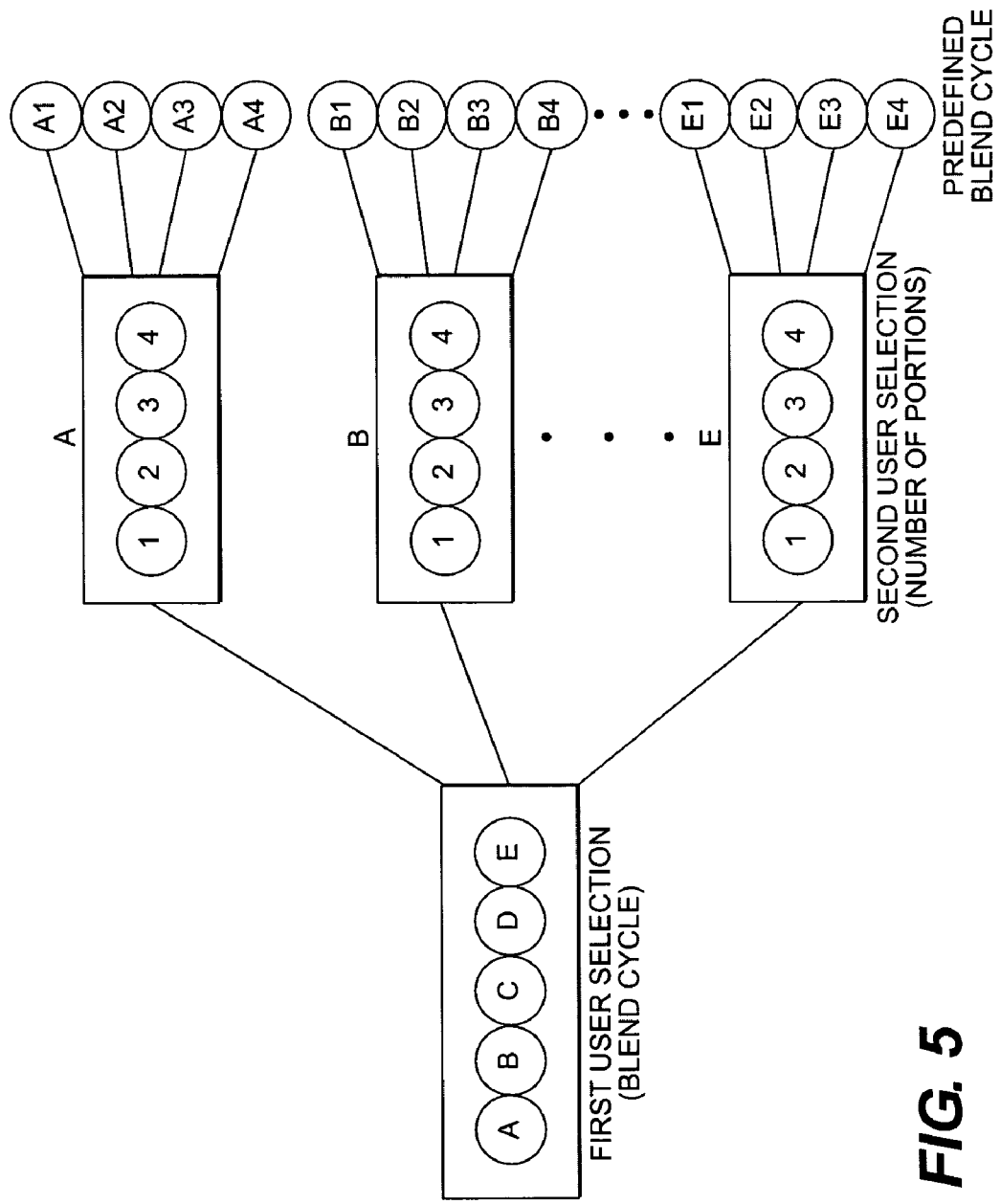
FIGS. 5 and 6 are flow charts demonstrating the operation of a graphic user interface to obtain improved portion blending.

With reference to FIG. 5, a user makes a first selection of a specific blender cycle. No graph or other indication of specific power versus time is usually shown. Instead, the user merely selects a type of material to be blended or an intended type of mixed drink—for example, a daiquiri, margarita, smoothie, etc. Then, because the size of batch is important for a blending cycle when defining an appropriate cycle, the number of portions is entered by the user. Usually, the number of portions will indicate or will be proportional to the number of drinks to be served by the blended material. In FIG. 5, the first selection is the specific blender cycle and the second selection is the number of portions. Of course, this order could be reversed.

Figure 6:
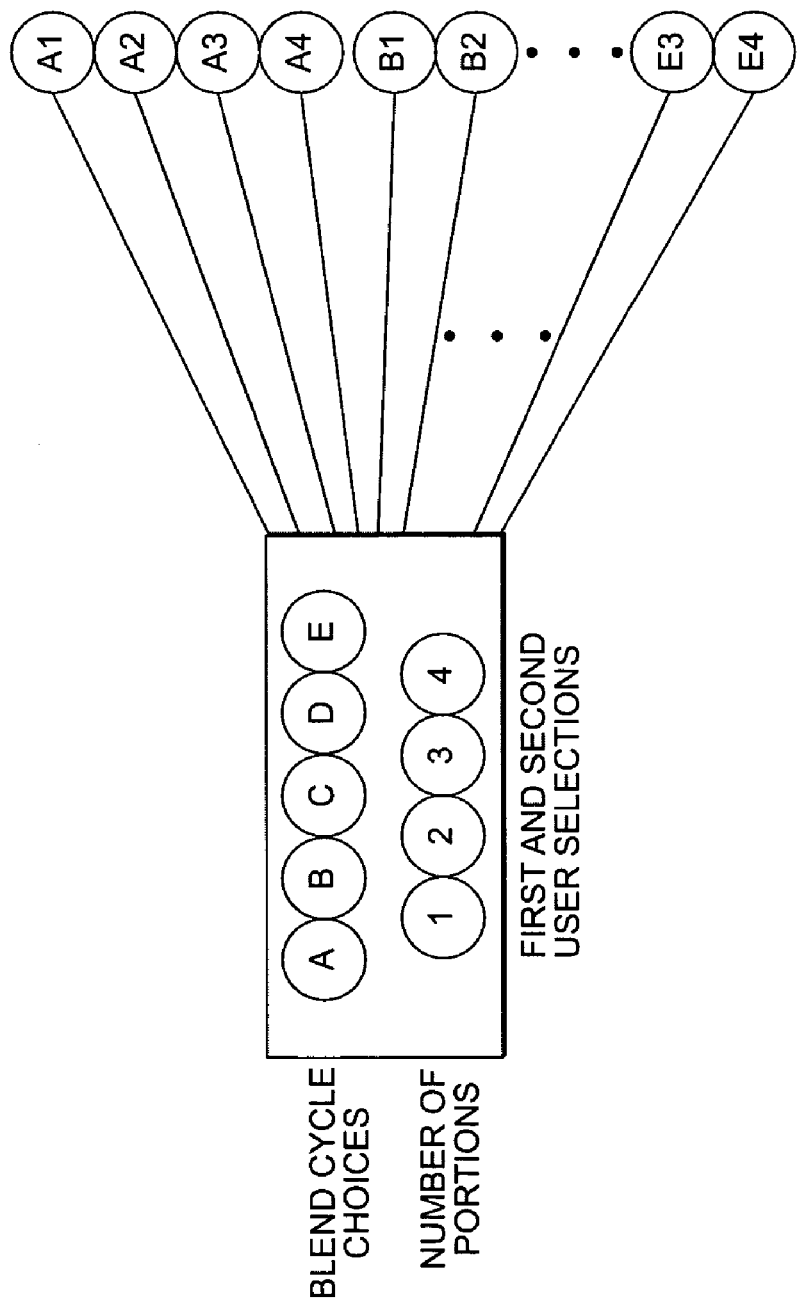

Still further alternatively, as shown in FIG. 6, the graphic user interface may display a selection of both the type of blender cycle and the number of portions. In that example of FIG. 6, the blender would not activate until both a blender cycle and a number or portions is selected. Once each is selected, then a predefined blend cycle will be run on the blender. Or, alternatively, once each is selected, then a "start" button is pressed and a predefined blend cycle will run.

In each of the blend cycles chosen by the user, e.g., A1, A2, etc., the ultimate blend cycle can be a unique, predefined blend cycle. In the example of FIG. 5, therefore, twenty different unique blend cycles can be chosen by the user in the two-step process described. In operation, each cycle may be custom tailored for the specific drink and amount of drink being processed/blended. While it is possible that two or more of the specific blend cycles may actually be the same cycle, that is not necessary.

Also, it is desirable for a blender to retain in memory the last blend cycle. In this way, a user or blender operator can change zero, one or two of its specific blend cycle choices before pressing a start key to begin the blend cycle.

As an alternative to creating and storing in memory individual and custom blend cycles, it is possible to use a drink indexing factor. Drink indexing is a technique of allowing each blend cycle to be "adjusted" for drink size (number of portions) through the use of a factor to multiply the blend cycle curve time values. This makes the blend cycle more efficient for multiple drinks/portions and saves computer memory space in programming by eliminating the requirement for separate, unique cycles corresponding to each different number of portions of drinks associated with a particular blend cycle. The way the drink indexing works is that the base drink cycle (typically corresponding to a class of drinks such as a daiquiri or a smoothie) is based on one drink/portion only. (Drink indexing could be based on any number, but a single drink/portion is simple and intuitive to work with.) A blend cycle is defined as a routine that a blender motor follows where the RPM varies over a predefined time period. During the blend cycle, there are points that the RPM is instructed to change by (1) remaining constant, (2) ramping at a certain rate, or (3) jumping (90° ramp) to a different speed. Each of these points in the blend cycle are modified by a drink index factor which basically multiplies the time for each portion of the cycle by a predetermined number.

Figure 7A:
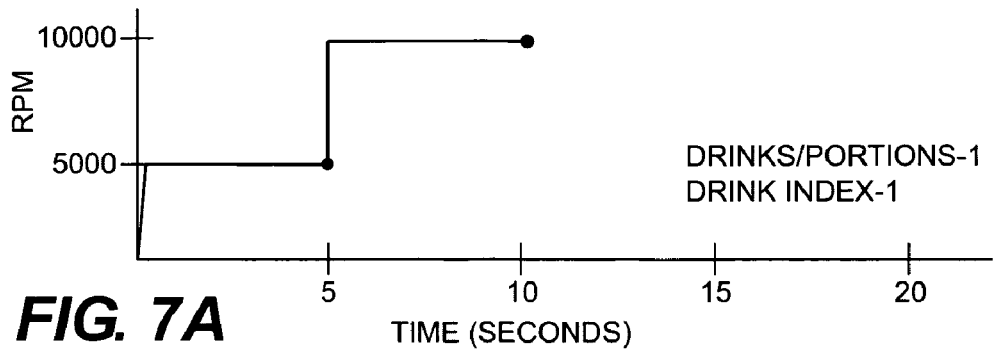
FIGS. 7A-D are graphs of an exemplary blend cycle that is modified by a drink index multiplier.
Figure 7B:
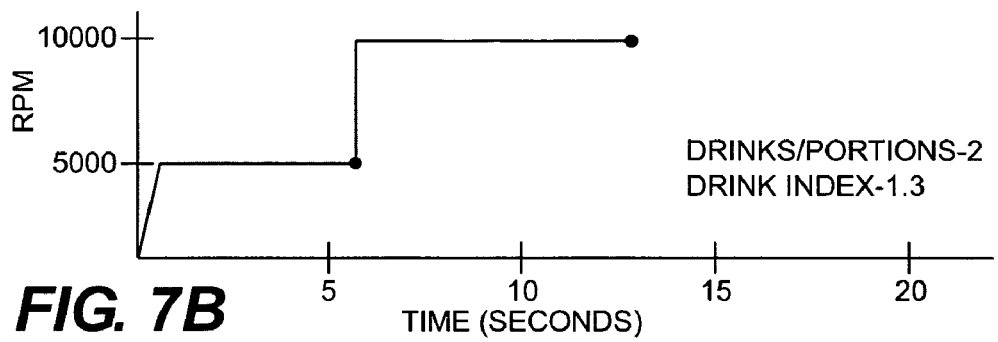
Figure 7C:
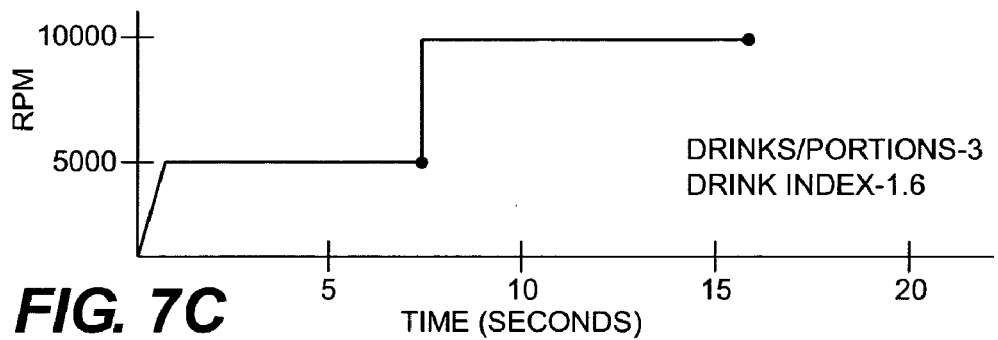
Figure 7D:
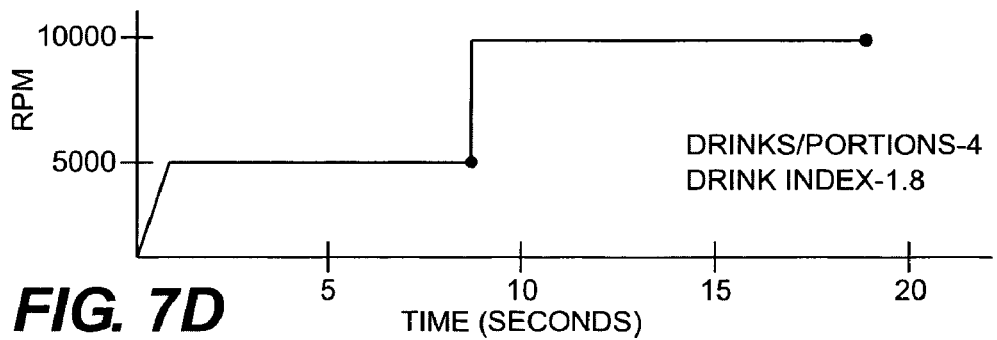

Referring now to FIGS. 7A-D, an example of a drink indexing program is demonstrated. In FIG. 7A, a simple blend cycle is illustrated for a single portion of a drink. The blend cycle in this hypothetical example consists of running at 5,000 RPMs for five seconds, and then jumping to 10,000 RPMs for five additional seconds. If a blender user were to select two drinks (two portions), and the drink index factor for two drinks was set at 1.3, then the cycle would be modified to operate the blender at 5,000 RPMs for 6.50 seconds, and then jumping up to 10,000 RPMs for 6.5 additional seconds. In this example, the RPM values are not affected. In other examples, the RPM value may also be indexed. As shown in FIGS. 7A through 7D, the drink index factor for two portions (FIG. 7A) is 1.3, three portions (FIG. 7C) is 1.6, and four portions (FIG. 7D) is 1.8. Each blend cycle corresponding to different drink media could have the drink index factors for any number of drinks assigned to them so that each drink has its own custom index. For instance, thicker drinks may need more time to blend multiple portions than thinner drinks. In other words, a smoothie may require more blend time than a daiquiri when multiplying the number of drinks. A selection of drink index factors will further vary depending on type of blender motor blender jar, cutter assembly, etc. The bottom line is that the selection of drink index factors is a subjective analysis.

Of course the blend cycle shown in FIGS. 7A-D is a very simple cycle used for demonstrative purposes only. Other cycles are known to those with skill in the art. The drink indexing feature can be applied just as well to these other cycles. Also, as noted, the drink indexing feature described herein is focused on the time of operation of the blender and each step in the blend cycle. The drink indexing may also additionally or alternatively be applied to the RPMs of a given blender.

While the invention has been described with reference to specific embodiments thereof, it will be understood that numerous variations, modifications and additional embodiments are possible, and all such variations, modifications, and embodiments are to be regarded as being within the spirit and scope of the invention.

What is claimed is:

1. An electronic blender control system for producing a consistent, blended material by monitoring over time the relative difference in a blender trait or attribute, the system comprising:
   a blender assembly comprising a blender motor operatively connected to a cutter assembly, wherein the cutter assembly is mounted in a blender jar for blending material placed within the jar;
   an energy control switch that activates and controls the amount of energy delivered to the motor during operation of the motor;
   a feedback sensor electrically connected to the energy control switch, wherein the feedback sensor is adapted to detect revolutions per minute of the blender motor during at least two moments in time to produce at least a first measurement and at least a second measurement, and send a signal to the energy control switch based on a difference between the first measurement and the second measurement of the revolutions per minute of the blender motor; and
   the signal being sent to the energy control switch when the difference between the first measurement and the second measurement of revolutions per minute reaches a desired variation.

2. An electronic blender control system as described in claim 1, wherein the signal that is sent is a command to reduce the amount of energy delivered to the motor.

3. An electronic blender control system as described in claim 2, wherein the amount of energy commanded to be delivered to the motor is substantially zero.

4. An electronic blender control system for producing a consistent, blended material by monitoring over time the relative difference in a blender trait or attribute, the system comprising:
   a blender assembly comprising a blender motor operatively connected to a cutter assembly, wherein the cutter assembly is mounted in a blender jar for blending material placed within the jar;
   an energy control switch that activates and controls the amount of energy delivered to the motor during operation of the motor;
   a feedback sensor electrically connected to the energy control switch, wherein the feedback sensor is adapted to detect an amount of power used by the motor during at least two moments in time to produce at least a first measurement and at least a second measurement, and send a signal to the energy control switch based on a difference between the first measurement and the second measurement of the amount of power used by the motor; and
   the signal being sent to the energy control switch when the difference between the first measurement and the second measurement of the power used reaches a desired variation.

5. An electronic blender control system as described in claim 4, wherein the signal that is sent is a command to reduce the amount of energy delivered to the motor.

6. An electronic blender control system as described in claim 5, wherein the amount of energy commanded to be delivered to the motor is substantially zero.

7. An electronic blender control system for producing a consistent, blended material by monitoring over time the relative difference in a blender trait or attribute, the system comprising:
   a blender assembly comprising a blender motor operatively connected to a cutter assembly, wherein the cutter assembly is mounted in a blender jar for blending material placed within the jar;
   an energy control switch that activates and controls the amount of energy delivered to the motor during operation of the motor;
   a feedback sensor electrically connected to the energy control switch, wherein the feedback sensor is adapted to detect an amount of torque exerted on the motor during operation during at least two moments in time to produce at least a first measurement and at least a second measurement, and send a signal to the energy control switch based on a difference between the first measurement and the second measurement of the amount of torque exerted on the motor during operation; and
   the signal being sent to the energy control switch when the difference between the first measurement and the second measurement of torque reaches a desired variation.

8. An electronic blender control system as described in claim 7, wherein the signal that is sent is a command to reduce the amount of energy delivered to the motor.

9. An electronic blender control system as described in claim 8, wherein the amount of energy commanded to be to the motor is substantially zero.

10. An electronic blender anticavitation control system that monitors over time the difference in a blender trait or attribute, the control system comprising:
    a blender assembly comprising:
    a blender motor operatively connected to a cutter assembly, wherein the cutter assembly is mounted in a blender jar for blending material placed within the jar;
    an energy control switch that activates and controls the amount of energy delivered to the motor during operation of the motor;
    a feedback processor comprising a feedback sensor electrically connected to the energy control switch, wherein the feedback sensor is adapted to detect an attribute associated with the operation of the motor during at least two moments in time to produce at least a first measurement and at least a second measurement and send a signal to the energy control switch based on a variation between the first measurement and the second measurement of the attribute detected;
    wherein the feedback processor is adapted to analyze the attribute information detected by the feedback sensor, and when the variation between the first measurement and the second measurement increases during a blend cycle and the processor determines that cavitation is occurring, sending a signal to the energy control switch to change the amount of energy delivered to the motor.

11. An electronic blender control system as described in claim 10, wherein the signal sent to the energy control switch is a command to reduce the amount of energy delivered.

12. An electronic blender control system as described in claim 10, wherein the signal sent to the energy control switch is a command to substantially shut off the energy.

* * * * *